COLOR TELEVISION SIGNAL RECORDING AND REPRODUCING APPARATUS

Filed Feb. 10, 1955 2 Sheets-Sheet 1

INVENTOR.
WILLIAM D. HOUGHTON
BY [signature]
ATTORNEY

June 23, 1959 W. D. HOUGHTON 2,892,022

COLOR TELEVISION SIGNAL RECORDING AND REPRODUCING APPARATUS

Filed Feb. 10, 1955 2 Sheets-Sheet 2

INVENTOR.
WILLIAM D. HOUGHTON
BY
[signature]
ATTORNEY 2,892,022

COLOR TELEVISION SIGNAL RECORDING AND REPRODUCING APPARATUS

William D. Houghton, Princeton, N.J., assignor to Radio Corporation of America, a corporation of Delaware Application February 10, 1955, Serial No. 487,246

9 Claims. (Cl. 178—5.4)

The present invention relates to improvements in recording systems and more particularly to magnetic recording systems designated to record composite electrical signals containing a periodically recurrent low frequency datum component which after reproduction is to be fully recovered by signal clamping techniques.

More directly, the present invention relates to improvements in multichannel recording systems preferably of the magnetic class of a type suitable for recording and reproducing television signals of either the monochrome or color variety.

In signal communication and instrumentation systems it sometimes becomes desirable to record, for later reproduction, composite electrical signals having an intelligence component and a periodically recurrent datum component. The periodically recurrent datum component may be made to represent relatively low frequency signal information of a value below that which otherwise would be considered the low frequency capacity of the recording or reproducing system. For example, the standard composite television signal comprises a video component and a blanking component. The blanking component is substantially a rectangular wave which periodically recurs at the television line frequency. Very low frequency variations in the over-all brightness of a television signal being transmitted are represented by changes in the difference between the amplitude of the blanking component and the alternating current axis of the composite television signal. According to present standards a fixed amplitude line synchronizing pulse is imposed on top of the blanking pulse to form what is commonly called the composite blanking and synchronizing pulse wave form. This blanking waveform forms a type of pedestal upon which the synchronizing pulse rests. High frequency variations in scene brightness throughout each television line is represented by the video component of the television signal which is transmitted between blanking pulses and includes important frequencies in the range from 400 cycles per second to 4 megacycles.

Very low frequency variations in scene brightness, which in effect represent a varying direct current component of the television signal, are conventionally recovered by clamping the composite television signal so that the tips of the synchronizing pulses (and hence the blanking wave form pedestal) are established at fixed direct current datum potentials such that variations in the alternating current axis of the composite television signal relative to these datum may be transduced by an integrating circuit to produce a direct current potential whose value varies in accordance with low frequency changes in scene brightness. The peak of the blanking pulse component of a television signal may therefore be thought of as a datum against which the alternating current axis of the television signal changes in position to depict low frequency video information.

Thus the techniques of transmitting periodically recurrent datum pulses which in effect vary in amplitude relative to the alternating current axis of a composite signal provide means for transmitting direct current information over signal channels otherwise capable of handling only alternating current signals. The periodically recurrent datum component and its variation in amplitude relative to the alternating current axis of the composite signal is in effect a sampling system which represents sampling of the D.C. component to be transmitted and which may be recovered by clamping techniques within the ultimate signal utilization means.

The present invention provides improved means for recording and reproducing composite electrical signals having a periodically recurrent datum component representing low frequency signal variations and an accompanying high frequency alternating current intelligence signal which ensures that the clamping action employed in establishing a direct current component in the reproduced signal is independent of minor speed variations in the recording medium. Moreover, in color television systems where a fixed relationship must be established between the timing of the blanking and line synchronizing pulses and the well known color subcarrier component of the signal the principles of the present invention make it possible to substitute, after clamping of the reproduced recorded signal, a composite blanking and synchronizing pulse waveform with associated color flag burst which bear the proper relation to the color subcarrier as it may be later modulated by the reproduced color signals for standard broadcast transmission. In this way, variations in the speed of the recording medium on playback do not interfere with the ultimate transmission of the reproduced color signal in accordance with established color television standards.

In one form of the present invention the composite electrical signal including a periodically recurrent datum component is recorded on one track of a moving recording medium, while a reference signal integrally related in frequency to the datum component is recorded on a separate track on the same recording medium. On playback, the reference signal is employed to control a keyed clamping circuit which operates upon the composite signal as reproduced from the other track of the recording medium.

In the embodiment of the present invention in color television recording systems, the reference signal may be made to correspond to the horizontal drive pulses used in camera control. After clamping of the reproduced signal a standard composite blanking and synchronizing pulse waveform generated independently of the moving recording medium is mixed with the reproduced signal. Broadcast of the reproduced color television signal in accordance with color television standards is then possible regardless of variations in the speed of the recording medium.

It is therefore an object of the present invention to provide an improved recording system which permits the recording and accurate reproduction of electrical signals having a high frequency component and a recurrent datum component which may represent low frequency signal information below the direct low frequency handling capabilities of the recording system.

It is a further object of the present invention to provide an improved recording system for recording and reproducing television signals substantially independent of minute but otherwise intolerable variations in the speed of the recording medium.

It is yet another object of the present invention to provide a magnetic recording system in which color television signals may be effectively recorded and reproduced in accordance with color television standards independently of minute but otherwise intolerable variations in the speed of the recording medium.

A better understanding of the present invention as well as other of its objects and features of advantage may be obtained by a reading of the following specification, especially when taken in connection with the following drawings, in which.

Figure 1:
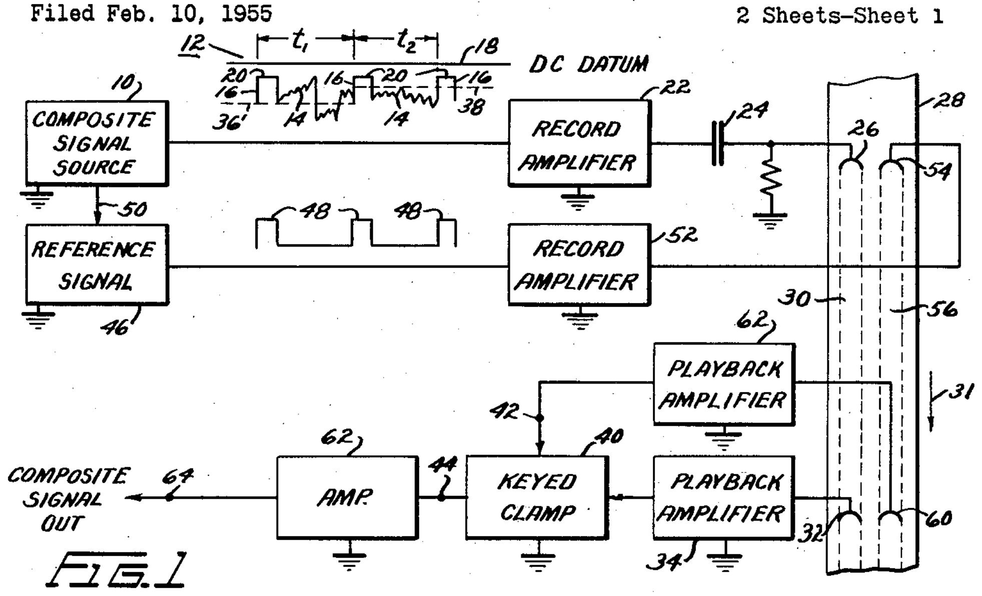
Fig. 1 is a combination block and diagrammatic representation of one form of signal recording and reproducing system embodying the novel features of the present invention.

Turning now to Fig. 1, there is indicated by the block 10 a source of composite electrical signal. The composite electrical signal delivered by the source 10 may for example be of the form shown at 12, in which a high frequency alternating current component 14 is periodically interrupted by a recurrent pulse like datum component 16 having a period corresponding to the equal time intervals $t_1$ and $t_2$. The composite electrical signal 12 is further represented as having a direct current component indicated by the direct current (D.C.) datum 18. In order to later recover direct current information from alternating current representations of the signal by well known clamping techniques, the peaks 20 of the datum pulses 16 are established at a fixed direct current potential relative to the direct current datum 18. The signal 12 is applied to a record amplifier 22 which is in turn capacitively coupled, via capacitor 24, to a recording instrumentality 26. Purely by way of illustration, the recording instrumentality 26 is illustrated as being of the magnetic type which may be any suitable form of magnetic recording head capable of handling the frequency spectrum represented by the signal 12 and positioned in operative relation to a moving magnetic recording medium 28. One form of magnetic head suitable for use in the practice of the present invention is shown and described in a co-pending application by J. A. Zenel, et al., Serial No. 380,854, filed September 17, 1953, entitled "Magnetic Record Transducer." The head 26 constitutes means for transducing the electrical signals delivered by the record amplifier in the corresponding magnetic field variations which define a recording track 30 on the medium 28.

A magnetic reproducing head 32 may be positioned on the track 30 at a point on the medium after the signal 12 has been recorded. By way of example, magnetic medium 28 has been indicated as a tape moving in the direction of the arrow 31. The magnetic reproducing head 32 may also be conventional in nature to constitute means for transducing remanent magnetic field variations recorded on the track 30 into electrical signals applied to the playback amplifier 34. The output waveform of the playback amplifier 34 will be generally of the form shown at 12 with the exception that no direct current component per se will be present. This absence of direct current component is attributable to the low frequency limitations of the magnetic recording system in which the reproducing head 32 is assumed to be of a type responsive to changes in magnetic flux as the tape medium is moved past the head. Moreover, coupling capacitor 24 to the recording head 26 will prevent direct current variations from being recorded in the first instance.

The output signal on the playback amplifier 34, although having no direct current component, does contain the datum pulses 16, the amplitude of which relative to the alternating current axis of the signal will define direct current data. This may be seen by reference to the waveform 12. The datum pulses 16 are periodically recurrent and are therefore separated by the aforementioned equal periods time $t_1$ and $t_2$. The alternating current axis of the signal during the interval $t_1$ is indicated by dotted line 36 and represents the average direct current value of the signal 12 during the interval $t_1$. The alternating current axis 38 represents the average direct current value of the signal 12 during the interval $t_2$. Since the peaks 20 of the datum pulses 16 are originally established at a fixed D.C. level relative to the direct current datum 18, it follows that after removing the direct current component from the signal the amplitude of the datum pulses relative to the alternating current axis of the signal will represent a measure of the average direct current value of the original signal 12 for each succeeding time period $t_1$, $t_2$, etc. following each datum pulse. This technique is well known in the art.

Reproduced signal from the amplifier 34 could conceivably be clamped by conventional peak clamping devices to establish a form of direct current component of the type shown by way of example in the patent to Wendt, No. 2,299,944, issued October 27, 1942. However, such peak clamping devices may clamp on signal noise and fortuitous excursions of the high frequency component 14 beyond the peak value of the datum pulses 16. It is therefore desirable to use a keyed clamping circuit of a type for example shown by C. L. Thompson in an article entitled "The Clamp Circuit" in the Broadcast Journal for January 1947. The keyed clamping circuit is responsive to applied keying signal which actuates the clamp circuit only during the keyed intervals. In this way the reproduced signal from the playback amplifier 34 may be applied to a keyed clamp circuit 40 which is actuated by keying pulses applied to a keying control input terminal 42 which are caused to occur only during the intervals of the datum pulses 16. If the keying pulses applied to the terminal 42 are synchronously related to the reproduced datum pulses 16, the clamping circuit 40 will establish the peak of each datum pulse at the same direct current level so that a direct current component will appear in the output signal delivered at terminal 44.

It is evident that if the keying pulses applied to terminal 42 of the clamp circuit 40 are not in close synchronism with the occurrence of the reproduced datum pulses, the clamp 40 will have a tendency to clamp other portions of the reproduced signal to the fixed D.C. datum with the development of a subsequent error in the D.C. component of the signal delivered at terminal 44. Although means are known for maintaining the reproducing speed of the recording medium 28 at a substantially constant value, in practical driving systems there will be inherent minute fluctuations in the speed of the recording medium. If the frequency of the recurrent datum pulses 16 is quite high the minute variations in the speed of the recording medium may produce intolerable phase shift in the reproduced signal. An effort therefore to apply independently generated keying pulses to the clamp circuit 40 from an oscillator having no relation to the speed of the recording medium could cause clamping of the reproduced signal on portions other than the datum pulses.

In accordance with the present invention, means are provided at 46 for generating reference signal 48 which is integrally related in frequency to the frequency of the datum pulses 16. By way of example, the reference signal pulses 48 are shown to be in synchronism with the datum pulses 16. The reference signal source 46 may be electrically tied at 50 to the composite signal source to maintain a fixed timing relation between the composite signal source and the reference signal source.

In accordance with the present invention the reference signals 48 are applied to a record amplifier 52 which is in turn connected in driving relation to a recording instrumentality 54. The recording instrumentality 54 may also be a conventional magnetic recording head which defines a separate track 56 on the recording medium. The playback head 60 is shown connected with the playback amplifier 62 for reproduction of the reference signal.

Electrical representations of the reproduced reference signal are applied to the keying control terminal 42 of the clamp circuit 40. In this way the clamp circuit 40 is actuated by the reference signal which is reproduced by the same recording medium as the composite signal. Any speed variation in the recording medium will therefore not interfere with the precise clamping of the reproduced signal during the datum pulses. The clamped signal is shown applied to a direct current output amplifier 62 which amplifies the clamped reproduced signal to a useful level made available at terminal 64.

It will be understood that in the embodiment of the invention shown in Fig. 1 as well as other embodiments of the invention to be discussed hereinafter, the recording medium 28 need not be magnetic in nature. The recording and reproducing instrumentalities 26, 32, 54 and 60 may take a variety of forms depending upon the nature of the moving recording medium 28 and the bandwidth and frequency of the signals to be recorded. For example, the recording medium 28 may be a portion of a photographic film with the recording tracks 30 and 56 corresponding to density modulated areas on the film.

Figure 2:
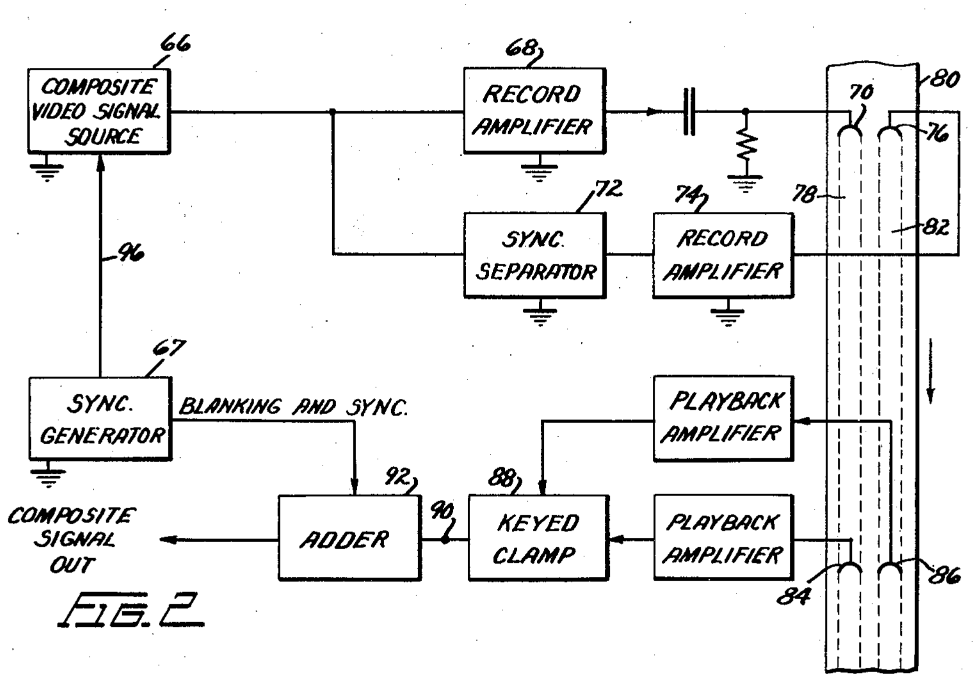
Fig. 2 is a combination block and diagrammatic representation of a television signal recording and reproducing system embodying the novel features of the present invention.

That aspect of the present invention illustrated in the embodiment of Fig. 1 may be complemented by another novel feature of the present invention to provide a very effective means for recording and reproducing composite television signals. Such an arrangement is shown in Fig. 2. A source of composite television or standard video signal is shown at 66. The source 66 may correspond to a conventional television camera chain controlled by a sync generator 67 which is productive of a signal suitable for modulation of a standard television broadcast transmitter. The television signal produced by the source 66 is applied to a record amplifier 68 in turn capacitively coupled to a recording instrumentality 70. A conventional sync separator circuit 72 is also connected with the output of the signal source 66 for separating the synchronizing pulses from the composite television signal. The separated synchronizing pulses are in turn applied to the record amplifier 74 which is connected in driving relation to the recording instrumentality 76. In this way a composite A.-C. television signal is recorded on track 78 of the recording medium 80 while the synchronizing pulses are separately recorded on track 82. Due to the characteristics of magnetic tape, A.-C. signals are faithfully reproduced but D.-C. signals are substantially attenuated. This, of course, results in a change in the tonal values of the image that is reproduced from such signals which are easily correctable by the technique known as D.-C. restoration. For the purposes of the present invention the synchronizing component of the composite television signal need not be faithfully represented by the recorded magnetic variations on the track 78 as will be seen hereinafter. The separated synchronizing pulses recorded on track 82 correspond to the reference signal 48 of Fig. 1. On playback, reproducing instrumentalities 84 and 86 provide reproduced composite television signal and keying information respectively to the keyed clamp circuit 88. The clamped composite television signal appearing at the output terminal 90 of the clamp circuit therefore contains a restored direct current component which is independent of speed variations in the driven recording medium 80 which although minute would otherwise be intolerable in the absence of the present invention. However, although the direct current component has been accurately restored, the phase of the reproduced clamped signal comprising video information, blanking information and possibly synchronizing pulse representations, will shift as a function of variations in the speed of the recording medium. Such a signal having phase shift variations may not meet FCC broadcast standards which establish rather rigid tolerances for the timing of sync and blanking information.

Therefore in accordance with the present invention standard blanking and synchronizing signals are superimposed upon the reproduced clamped signal by means of the adder circuit 92. The standard blanking and sync waveforms may be derived from the standard sync generator circuit 67 which is electrically tied via the circuit path indicated at 96. The amplitude of the blanking and synchronizing waveforms supplied by the sync generator 67 and added to the composite signal from the clamp circuit 88 may be sufficiently greater than the amplitude of the blanking component in the clamped signal provided by adder 92 so that the standard 10% setdown of the picture black level relative to the broadcast blanking level is realized. The output signal from the adder circuit 92 may then be applied to a conventional television transmitter for commercial broadcast. It will be understood, as more fully discussed hereinafter in connection with the embodiment of the present invention shown in Figure 3, that some speed control means must be employed during playback of the medium to ensure a nominally synchronous relation between the reproduced sync pulses and the blanking pulses from the generator 67. This nominal synchronous relation, however, may still embrace minute variations in the speed of the recording medium relative to the heads of a magnitude so small that their elimination becomes impractical. The servo speed control systems involving elements 170 and 174 in Figure 3 constitute one suitable means for obtaining this nominal synchronous relation. Since, as is described hereinafter, the speed control techniques which may be employed in the operation of the arrangement shown in Figure 2 do not concern the present invention per se, there has been no showing of such speed control means in the illustration of Figure 2. Any minute variations in the speed of the recording medium will therefore have only the effect of shifting the reproduced blanking level of the signal appearing at the output of the clamp circuit 88 relative to the blanking component introduced at the adder 92. Since the blanking component introduced at the adder circuit 92 is preferably greater by the aforementioned 10% differential, the reproduced picture will suffer only in the respect that individual picture elements may shift with respect to the vertical edges of the television frame. In practice, such shift has been found to produce no significant degradation of the television picture.

The advantages of the present invention in the reproduction of recorded television signals are particularly noteworthy in connection with color television signal systems. The arrangement of Fig. 3 illustrates one way in which the present invention may be embodied in a complete magnetic recording and reproducing system for standard color television signals.

Figure 3:
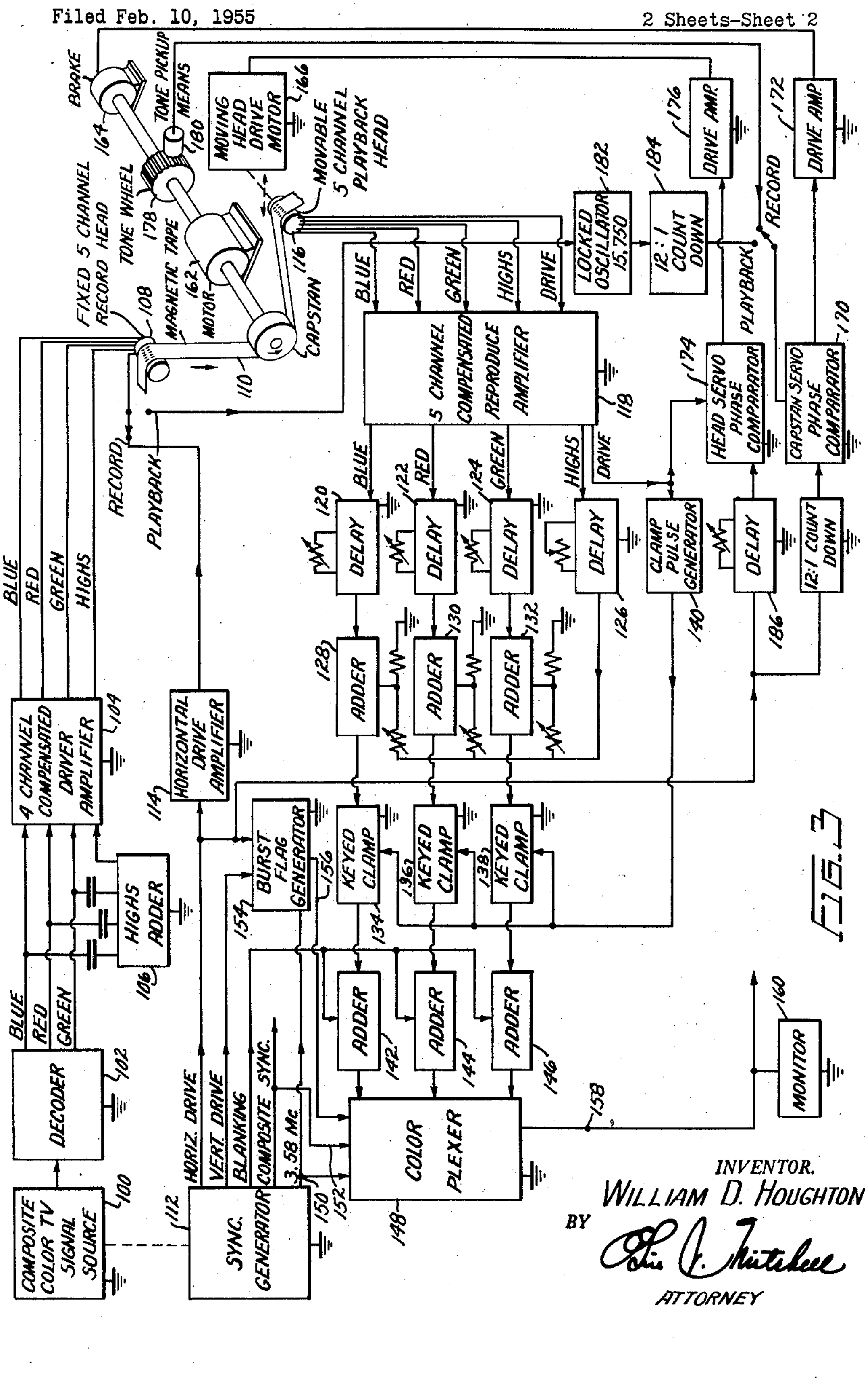
Fig. 3 is a combination block and diagrammatic representation of a complete color television signal recording and reproducing system embodying the novel features of the present invention.

In Fig. 3, a source of standard composite color television signal is indicated at 100. The signal delivered by the source 100 comprises the standard video component, blanking component, line and frame synchronizing components, suppressed carrier color modulation products of a standard color subcarrier and a color burst flag synchronizing component. The composite television signal is applied to a color signal decoder 102 which breaks the composite signal up into blue, red and green direct color signals. The blue, red and green direct color signals are applied through respective compensated amplifiers within the four-channel amplifier unit 104. High frequency components of the blue, red and green direct color signals are combined in the highs adder circuit 106 to form a mixed highs signal which is also amplified by a separate amplifier within the four-channel amplifier unit 104. The amplified and compensated blue, red and green and mixed highs signals are applied to respective magnetic recording head elements in a five-channel record head unit 108. By this means the blue, red, green and mixed highs signals are recorded on separate respective tracks defined on a magnetic tape recording medium 110.

In accordance with the present invention, the fifth magnetic recording head element within the five-channel record head unit 108 is supplied with reference signal which is integrally related in frequency to the blanking component in the blue, red, green direct color signals. By way of example, a horizontal drive pulse delivered by standard sync generator 112 operatively synchronized with the source 100 may be recorded as a reference signal. For this purpose, the horizontal drive pulses from the sync generator 112 are applied to the horizontal amplifier 114 which is connected in driving relation at the fifth magnetic recording element of the record head 108.

The reproduction of the signal information on the five recorded magnetic tracks on medium 110 is accomplished by the five-channel playback head unit 116 having five separate magnetic reproducing head elements positioned in operative relation to the magnetic tracks imposed on the recording medium 110 by the record head 108. The blue, red, green, mixed highs and horizontal drive reference signals reproduced by the playback head 116 are applied to respective amplifier channels provided by the five-channel compensated reproducing amplifier 118. The amplified blue, red, green and mixed highs signals are applied to respective variable time delay elements 120, 122, 124 and 126. These variable time delay elements provide means for correcting for fortuitous misalignment of the individual playback head elements within the five-channel head 116. The reproduced mixed highs signal is added to the reproduced direct color blue, red and green signals in the adder circuits 128, 130 and 132 respectively. The direct color blue, red and green signals after being mixed with discrete amounts of the mixed highs signal are substantially equivalent colorimetrically to the blue, red and green signals provided by the decoder 102 with the exception that they contain no direct current component.

In accordance with the present invention the blue, red and green signals delivered by the adder circuits 128, 130 and 132 are applied to keyed clamped circuits 134, 136, 138 respectively. The keying of the clamped circuits 134, 136, 138 is controlled by a signal developed by the clamp pulse generator 140 in turn synchronized with the horizontal drive pulses reproduced as a reference signal from the magnetic recording medium and amplified by one channel of the five-channel compensated reproducing amplifier 118. The clamped pulse generator 140 may be of the single shot multivibrator type shown for example in an article entitled "Multivibrators" in the April 1953 issue of Electronics magazine. In this way the direct color signals are suitably clamped to establish and restore a direct current component in the reproduced direct color signals independently of minor speed variations in the magnetic recording medium 110.

In further accordance with the present invention, the clamped direct color signals are applied to adder circuits 142, 144 and 146 in which a standard blanking signal delivered by the sync generator 112 is superimposed upon the direct color signals. The blanking component from the sync generator 112 may be sufficiently greater in amplitude than the blanking component of the direct color signals so as to define the aforementioned standard 10% differential between the broadcast blanking pulse and the video black level. The reconstituted signals appearing at the output of the adder circuits 142, 144 and 146 are are thereby provided with a blanking component independent of speed variations in the recording medium. Such signals are suitable for application to a colorplexer unit 148 which may be of the type TX1B manufactured by the RCA Manufacturing Company, Camden, New Jersey, circuit details of which are shown in the TX1B Service Bulletin published by the RCA in January 1953. Here the reconstituted direct color signals are caused to modulate a standard color subcarrier signal delivered by the sync generator 112 at terminal 150. By way of example, the standard color subcarrier frequency has been indicated as 3.58 mc. The composite horizontal and vertical sync signals delivered by the sync generator 112 are applied to the colorplexer via circuit path 152. A color burst flag signal generator 154 also supplied bursts of 3.58 mc. color subcarrier to the colorplexer via circuit paths 156. The color burst flag signal is timed in a standard fashion to occur on the back portion of the standard blanking pulse provided by the sync generator. The burst flag generator is shown to receive horizontal drive information, vertical drive information and 3.58 mc. color subcarrier. The burst flag generator may be of the type commercially sold as MI40202, manufactured by the Radio Corporation of America, Camden, New Jersey, circuit details of which are shown in the Service Bulletin for the MI40202 Flag Generator printed in May 1953. The composite television signal delivered by the colorplexer 148 at output terminal 158 thereof will then be substantially identical to the composite color television signal produced by the signal source 100. Small variations in speed of the magnetic recording medium will in no way interfere with the proper color interlace of the reproduced color television signal. Variation in the speed of the magnetic medium will produce only minor displacements of individual picture line elements in the reproduction of the color television signal. A monitor 160 may be connected with terminal 158 for viewing the quality of the reproduced television scene during playback of the recording medium. The reproduced color television signal provided by the colorplexer 148 may be used to directly modulate a standard color television transmitter in full compliance with existing color broadcast standards.

Although forming no part of the present invention, two separate servo systems have been illustrated for minimizing variations in the speed of the capstan drive motor 162 by an electrically energized brake 164 and a reproducing head drive motor means 166. The electrically energized servo brake 164 is controlled by a signal delivered by the capstan servo phase comparator circuit 170 and amplified by the drive amplifier 172. The moving head drive motor 166 is supplied with servo information from the head servo phase comparator circuit 174 and amplified by the driving amplifier 176. During recording the servo correction signal developed by the capstan servo phase comparator circuit 170 is the result of comparing a tone signal derived from the capstan tone wheel 178 and associated pickup means 180 with a signal representing in frequency one twelfth of the horizontal drive signal delivered by the sync generator 112. During playback, the capstan servo error signal delivered by the phase comparator 170 represents the comparison between two signals, the first synchronously representing the horizontal drive pulses provided by the sync generator 112 and the second synchronously representing the recorded horizontal drive (reference) signal as reproduced on playback by the horizontal drive recording head within the record head unit 108. This latter signal is derived by locking the oscillator 182 with reproduced horizontal drive pulses and then applying the oscillator signal to a 12 to 1 countdown circuit 184.

The head servo error signal on both record and playback results from a comparison between a signal representative of the reproduced horizontal drive pulses and the horizontal drive pulses delivered by the sync generator 112. Time delay means 186 permits the reproduced horizontal drive pulses to be nominally phased with the sync generator drive pulses. The head servo error signal is amplified as aforementioned by the drive amplifier 176 which actuates the moving head drive motor 166 to move the head to and fro along the line of tape motion in a manner complementing and tending to cancel the effects of tape speed variations.

Having thus described the invention, what is claimed is:

1. In an electrical system, a magnetic recording medium upon which is defined a plurality of separate magnetically recorded tracks, at least a first of which bears recorded representations of composite signal having an intelligence signal component and a first datum signal component, said datum component comprising recurrent signal excursions of an amplitude defining datum information relative to the alternating current axis of said composite signal and a second of said tracks bearing recorded representations of a reference signal of a predetermined frequency integrally related to the frequency of said recurrent datum excursions, means for driving said magnetic recording medium at nominal reproducing speed subject to fortuitous variations, a magnetic field responsive signal reproducing means in operative juxtaposition with said medium and responsive to the tracks thereon to separately reproduce said composite signal and said reference signal, a keyed clamping circuit means for electrically clamping portions of an electrical signal to a potential datum during keyed actuation of said clamping circuit means by a clamping control signal, means coupled with said signal reproducing means and said clamping means applying said composite signal to said clamping means for keyed clamping thereby, signal communicating means couplied with said signal reproducing means and said clamping means applying an electrical representation of said reproduced reference signal to said clamping means as a clamping control signal whereby the keyed clamping of said composite signal is rendered independent of said fortuitous variations in the driven speed of said recording medium.

2. Apparatus according to claim 1 wherein there is additionally provided a source of second datum signal of a nominal frequency integrally related to the frequency of said recurrent datum signals as reproduced by said signal reproducing means but independent of the speed of variations of said magnetic recording medium, a signal adder circuit means for combining at least two applied electrical signals to produce a product signal, and means coupled with said clamping means, said source of second datum signal and said circuit means applying said second datum signal and said clamped reproduced composite signal to said adder circuit means for producing a product signal containing a datum component independent of fortuitous speed variations in said recording medium in combination with the intelligence component of said composite signal.

3. Apparatus according to claim 2 wherein said composite signal source comprises means producing a television signal such that said intelligence component corresponds to video information and said first datum signal component corresponds to video blanking information.

4. In a magnetic record reproducing apparatus for television signals, a magnetic recording medium upon which is defined a plurality of separate recorded tracks, at least a first of which tracks bears recorded representations of an alternating current television signal having a video frequency component and a recurrent blanking component the amplitude of said blanking component relative to the alternating current axis of said television signal depicting direct current picture information and at least a second of said tracks bearing recorded representations of a reference signal of a predetermined frequency integrally related to the recurrent frequency of said blanking component, means for driving said magnetic recording medium at a nominal reproducing speed subject to fortuitous variations, a magnetic field responsive signal reproducing means in operative juxtaposition with said medium and responsive to the tracks thereon to separately reproduce said television signal and said reference signal a keyed direct current restoration circuit means for electrically clamping the blanking portions of a television signal to a potential datum during keyed actuation of said restoration circuit means by a keying signal to establish a direct current potential component in the television signal the value of which is inherently a function of the relative timing between said keyed actuation and blanking portions, means coupled with said signal reproducing means and said direct current restoration means applying said television signal to said restoration means for direct current restoration thereby, signal communicating means coupled with said reproducing means and said restoration means applying an electrical representation of said reproduced reference signal to said restoration means as a keying signal therefor whereby the value of direct current potential component established in said reproduced television signal is rendered substantially independent of said fortuitous variations in the reproducing speed of said medium.

5. A magnetic record reproducing apparatus according to claim 4 wherein there is additionally provided a source of standard blanking and synchronizing waveform signal having a fixed standard recurrence frequency, and wherein said driving means includes means for establishing the nominal reproduction speed of said medium such to reproduce said blanking component at a norminal recurrence frequency equal to said standard recurrence frequency subject to frequency deviations corresponding to said fortuitous speed variations, a signal adder circuit means for combining at least two applied electrical signals to produce a combined product signal, and means coupled with said restoration means, said standard blanking and synchronizing waveform source and said adder circuit means for producing a product signal containing a blanking component and a synchronizing component the timing of which is substantially independent of said fortuitous speed variations.

6. A magnetic record reproducing apparatus according to claim 5 wherein said television signal magnetically recorded on said medium represents a single color aspect of a color television image, and wherein there is additionally provided a source of flag bursts of a standard color subcarrier signal synchronously related to the signals produced by said source of standard blanking and synchronizing waveform signal, and wherein means are additionally provided coupled with said signal adder circuit and said flag burst source for superimposing said flag bursts upon the blanking component of the product signal produced by said signal adder circuit to produce standard color television signal synthesis.

7. Apparatus for magnetically recording standard color television signals representing a color television image comprising in combination a color television signal source providing a first, a second and a third separate color signals each representing a different color aspect of a color television image, each of said color signals including high frequency components and low frequency components, said low frequency components including a periodically recurring blanking component, a source of reference signal having a frequency substantially equal to the recurrence frequency of said blanking component, means coupled with said signal source deriving from said separate color signal a composite mixed highs signal representing the high frequency components of all of said color signals, means magnetically recording the low frequency components of said signals on respective tracks on a magnetic recording medium while recording said composite mixed highs signal and reference signal on still other separate tracks on said medium, driving means for driving said magnetic recording medium at a nominal speed subject to minute fortuitous variations, means simultaneously but separately reproducing from said medium said first, second and third color signals, said composite mixed highs signals and said reference signal, means for simultaneously but separately reproducing from the magnetic medium said first, second and third low frequency color signal components, said composite mixed highs signal and said reference signal, means combining said reproduced composite mixed highs signal with each of said reproduced low frequency color signal component to form a fourth, fifth and sixth separate color signals, and means separately clamping said fourth, fifth and sixth color signals in a keyed manner defined by said reproduced reference signal such to establish a direct current component in said fourth, fifth and sixth color signals of a value substantially independent of said fortuitous variations in said nominal driving speed.

8. Apparatus according to claim 7 wherein there is additionally provided means for producing a standard blanking and synchronizing pulse waveform of a frequency independent of said nominal recording speed, and means simultaneously superimposing said standard blanking and synchronizing waveform upon the blanking components of said fourth, fifth and sixth color signals.

9. Apparatus according to claim 8 wherein there is additionally provided a source of standard color subcarrier signal and color burst flag signal synchronously related to said reproduced blanking and synchronizing pulse waveform, and means combining said fourth, fifth and sixth color signals including said superimposed blanking and synchronizing waveform with said color subcarrier and color burst flag to produce a standard color television broadcast signal.

References Cited in the file of this patent

UNITED STATES PATENTS

| | | |
|---|---|---|
| 2,694,748 | Johnson | Nov. 16, 1954 |
| 2,695,331 | Johnson | Nov. 23, 1954 |
| 2,698,875 | Greenwood | Jan. 4, 1955 |